May 27, 1930.                O. J. BADERTSCHER                1,760,624
                              SERVO BRAKE MECHANISM
                               Filed Sept. 12, 1927
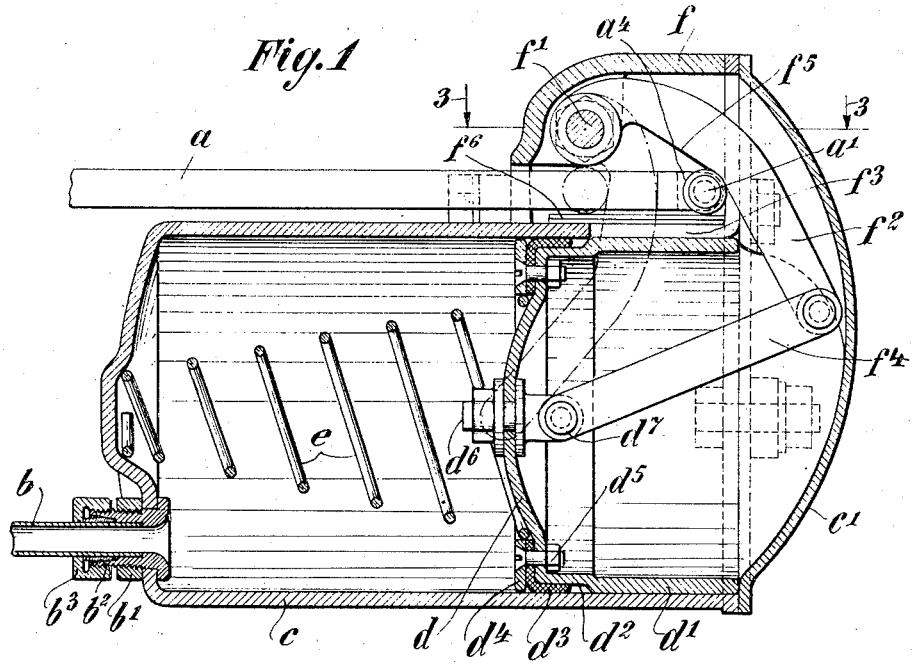
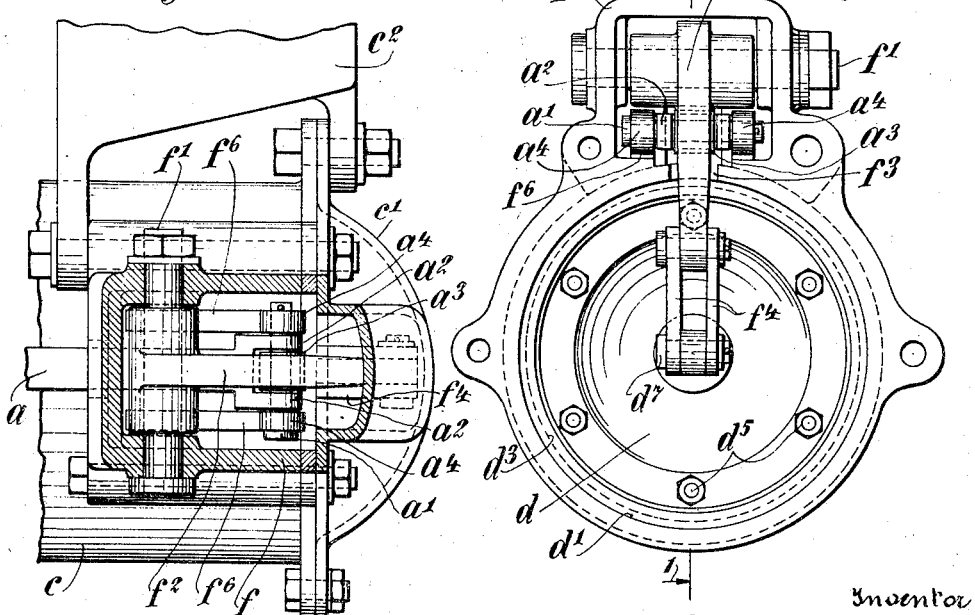
Inventor:
Otto J. Badertscher,
By his Attorneys
Redding, Greeley, O'Shea & Campbell Patented May 27, 1930

1,760,624

UNITED STATES PATENT OFFICE

OTTO J. BADERTSCHER, OF ZURICH, SWITZERLAND

SERVO-BRAKE MECHANISM

Application filed September 12, 1927. Serial No. 218,869.

This invention relates to mechanism for effecting the braking of vehicles and deals particularly with servo-brake systems, wherein the brake actuating force comprises a source of pressure, or vacuum pressure, produced by the vehicle engine. A specific system wherein the present invention is used to great advantage is shown in the co-pending application for vacuum servo-brakes for motor driven vehicles, Serial No. 152,090, dated December 2, 1926, of the present applicant.

Where the servo-brake cylinder is mounted at the wheel, it frequently happens that, due to the size of the wheel, the cylinder must be mounted apart therefrom and suitable linkage provided to serve as the mechanical connection to the brake. The added elements are obviously undesirable and the difficulty of mounting the brake cylinder at the most advantageous location, and maintaining the parts properly serviced, renders it highly desirable to mount the brake cylinder directly at the braking mechanism. The present invention provides a cylinder of sufficiently reduced size to enable it to be mounted directly within, or at, the braking mechanism without impairing the effectiveness thereof.

A further object of the invention is to provide a servo-brake mechanism which multiplies the braking force and provides a desirable amount of lost motion represented by the taking up of the slack on the brake band before the actual braking force becomes effective.

A further object of the invention is to provide a servo-brake mechanism which, during its initial movement in taking up the slack in the brake, provides a rapid movement of the brake mechanism, while, during final movement represented by the braking action, the movement is relatively slight and the mechanical advantage, or degree of multiplying the braking force supplied from the engine, relatively great.

The invention will be more apparent as the description proceeds in connection with the accompanying drawings wherein:

Figure 1 is a view in section, taken on line 1—1 of Figure 2, showing a preferred form of the invention.

Figure 2 is a view, in end elevation, showing the brake cylinder and associated mechanism of Figure 1 with the cover plate of Figure 1 removed.

Figure 3 is a view in section, taken on line 3—3 of Figure 1, and looking in the direction of the arrows.

Referring to the figures described above, $a$ designates a brake rod, or other linkage which is connected to the brake applying mechanism. $b$ indicates a conduit which communicates with a suitable pressure, or vaccum pressure source, produced by the engine of the vehicle upon which the braking device is to be applied. As the description proceeds it will be apparent that the structure embodied in the present invention may be used, with equal facility, in connection with other sources of pressure than that indicated herein, the present description serving only to illustrate a specific embodiment of the invention.

Conduit $b$ is secured to a brake cylinder by means of a suitable nipple $b'$, lock nut construction $b^3$ and packing $b^2$. This connection should, of course, be fluid tight in order that no loss of pressure may occur. A piston $d$ moves within the cylinder $c$ and is forced in one direction by means of a spring $e$, while, in the other direction, the suction through the conduit $b$ serves to move the piston to actuate the brake mechanism. The side walls $d'$ of the piston are provided with a circumferentially recessed portion $d^2$ adjacent the head of the piston. Within the recessed portion $d^2$, a packing $d^3$ is provided and is secured in position by means of an annular ring $d^4$, maintained in position by bolts $d^5$. It will be quite obvious that the packing $d^3$ is provided for the purpose of rendering a fluid tight connection between the cylinder wall $c$ and the movable piston $d$.

A bearing housing $f$ is connected on the rear end of the cylinder $c$ and carries a pivot shaft $f'$ which pivotally mounts a cam lever $f^2$. This lever moves within a slotted portion $f^3$ in the top of the cylinder and is connected with the piston $d$ by means of links $f^4$ and bolt $d^6$ provided with pivot bearings $d^7$ which are carried with the links $f^4$. A cam face $f^5$ is formed on the inner side of the lever $f^2$ and functions to apply the brake as described hereinafter.

The shaft $a$ carries a bearing shaft $a'$ within a forked shaped portion $a^2$ thereof. Between the forked members a roller $a^3$ is mounted, and on the opposite sides of the forked members, independent rollers $a^4$ are secured to ride on tracks $f^6$, carried inside the bearing housing $f$. It will be apparent from the above description that pivotal movement of the lever $f^2$ to the left causes the roller $a^3$ to have a rolling engagement with cam face $f^5$, while the rollers $a^4$ ride over tracks $f^6$, and the rod $a$ is moved axially to the left. During the initial movement of the lever $f^2$, the force applied upon the rod $a$ will be through a relatively great lever arm, represented by the length of the cam face $f^5$. In view of this, the axial movement of the rod $a$ will be rapid during initial movement of the lever $f^2$, but as the roller $a^3$ rides over the cam face $f^5$ the lever arm, through which the braking force is transmitted, becomes progressively shortened and the rate of movement of the rod $a$ decreases while the transmitted force increases. During the initial movement of the mechanism there will be a downward component of force exerted upon the bearing shaft $a'$ by the lever $f^2$ and this downward force is taken by the rollers $a^3$ and $a^4$. After the play in the brake mechanism has been taken up, represented by the initial movement of the lever $f^2$, the force transmitted from the lever $f^2$ to the rod $a$ is through a relatively small lever arm and the downward component of force upon the rollers approaches zero. At the point of maximum braking, the cam face $f^5$ is at right angles with the path of movement of the rollers $a^3$ and $a^4$ and the downward component of force is zero, thus enabling the entire force transmitted from the lever $f^2$ to the rod $a$ to be utilized in braking.

If desired, a suitable protecting cap $c'$ is provided to enclose the end of the cylinder $c$ and the mechanism carried thereby. The brake applying mechanism, described above, may be secured to a suitable bracket $c^2$, as shown in Figure 3. The specific form of cap, or manner of securing the structure to the vehicle forms no part of the present invention, and it will be understood that the arrangement of parts and design of the elements described above may be varied to suit certain conditions as desired.

From the foregoing description it will be seen that the time required to produce the braking action will be reduced considerably since the suction volume of the cylinder is greatly reduced and the resulting action of the piston increased proportionally. In addition to the other advantages flowing from the improved construction, the manufacturing cost thereof is reduced by reason of the smaller sized parts required for its assembly.

Although the invention has been described in connection with a vacuum braking system it is apparent that the force multiplying device may be used in connection with other sources of power and the invention is not to be limited save as defined in the appended claims.

I claim as my invention:

1. A servo-brake mechanism for vehicles comprising a driving member, a driven member, a force transmitting member, means to pivot the force transmitting member at one end to a fixed support, means to connect the driving member pivotally with the other end of the force transmitting member, rollers carried by the driven member, tracks upon which certain of the rollers ride, and a cam face on the force transmitting member to engage another of the rollers, the engagement between the force transmitting member and rollers of the driven member during braking action occurring while the angle between the cam face and the axis of the driven member approaches ninety degrees.

2. A servo-brake mechanism for vehicles comprising a cylinder, a piston movable therein, means to apply an actuating pressure to the piston, a force transmitting lever, means to pivot the lever in operative relation with the cylinder, means to connect the piston with the lever pivotally, a driven member, rollers carried upon the end of the driven member, tracks mounted upon the cylinder and upon which certain of the rollers ride, and a cam face on the lever to engage another of the rollers, angle of contact of the cam face with the axis of the driven member approaching 90° during braking action.

3. A servo-brake mechanism for vehicles comprising a cylinder, a piston movable therein, means to apply an actuating pressure to the piston, a force transmitting lever, means to pivot the lever in operative relation with the cylinder, means to connect the piston with the lever pivotally, a driven member, rollers carried upon the end of the driven member, tracks mounted upon the cylinder and upon which certain of the rollers ride, a slot between the tracks to permit the lever to move therein in its brake applying movement, and a cam face on the lever for engaging another of the rollers, the angle of contact of the face of the cam with the axis of the driven member, varying as the lever is moved.

This specification signed this 7th day of September, A. D. 1927.

OTTO J. BADERTSCHER.